US011901634B2

(12) United States Patent
Lee et al.

(10) Patent No.: US 11,901,634 B2
(45) Date of Patent: Feb. 13, 2024

(54) ANTENNA AND ELECTRONIC DEVICE INCLUDING SAME

(71) Applicant: Samsung Electronics Co., Ltd., Gyeonggi-do (KR)

(72) Inventors: Woosup Lee, Gyeonggi-do (KR); Youngsuk Yoo, Gyeonggi-do (KR); Sukgi Hong, Gyeonggi-do (KR); Dongyeon Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 228 days.

(21) Appl. No.: 17/668,540

(22) Filed: Feb. 10, 2022

(65) Prior Publication Data

US 2022/0271441 A1 Aug. 25, 2022

Related U.S. Application Data

(63) Continuation of application No. PCT/KR2022/000927, filed on Jan. 18, 2022.

(30) Foreign Application Priority Data

Jan. 18, 2021 (KR) ........................ 10-2021-0007038

(51) Int. Cl.

*H01Q 21/06* (2006.01)
*H01Q 5/25* (2015.01)
*H01Q 21/00* (2006.01)

(52) U.S. Cl.

CPC ............. *H01Q 21/065* (2013.01); *H01Q 5/25* (2015.01); *H01Q 21/0006* (2013.01)

(58) Field of Classification Search

CPC .......... H01Q 1/243; H01Q 1/38; H01Q 21/28; H01Q 9/0407; H01Q 21/065; H01Q 5/25;
(Continued)

(56) References Cited

U.S. PATENT DOCUMENTS 6,867,746 B2 3/2005 Mendolia et al.
7,629,928 B2 12/2009 Fabrega-Sanchez et al.
(Continued)

FOREIGN PATENT DOCUMENTS

KR 1020130060327 6/2013
KR 1020190038264 4/2019
(Continued)

OTHER PUBLICATIONS

International Search Report dated May 3, 2022 issued in counterpart application No. PCT/KR2022/000927, 11 pages.

*Primary Examiner* — Monica C King
(74) *Attorney, Agent, or Firm* — The Farrell Law Firm, P.C.

(57) ABSTRACT

An electronic device is provided, which includes an FPCB, wherein the FPCB includes a first portion in which an antenna is provided in the form of a patch antenna that overlaps a metal member, a second portion coupled to a connector of the circuit board, and a third portion arranged between the first portion and the second portion. A layered structure of the FPCB may include a dielectric material having a first thickness in the first portion overlapping the metal member and having a second thickness smaller than the first thickness in the second portion and the third portion, a first conductive layer provided in the first direction from the dielectric material, and an intermediate conductive layer provided in a second direction opposite to the first direction, from the dielectric material. The intermediate conductive layer may be provided only in the second portion and the third portion and may not be provided in the first portion. A portion of the dielectric material in the first portion can be arranged to face the metal member.

20 Claims, 12 Drawing Sheets

(58) Field of Classification Search

CPC ...... H01Q 1/48; H01Q 1/2291; H01Q 21/062; H01Q 9/045; H01Q 21/08; H01Q 21/24; H01Q 9/0414; H01Q 1/24; H01Q 1/46; H01Q 3/24; H01Q 5/307; H01Q 1/02; H01Q 1/22; H01Q 1/2216; H01Q 1/2266; H01Q 1/2283; H01Q 1/241; H01Q 1/52; H01Q 5/42; H01Q 7/00; H01Q 9/42; H01Q 1/1207; H01Q 1/273; H01Q 1/364; H01Q 1/40; H01Q 1/42; H01Q 1/422; H01Q 1/521; H01Q 13/24; H01Q 15/24; H01Q 21/0006; H01Q 23/00; H01Q 25/00; H01Q 3/26; H01Q 3/2605; H01Q 3/36; H01Q 5/10; H01Q 5/321; H01Q 5/35; H01Q 5/364; H01Q 7/06; H01Q 9/0421; H01Q 9/0442; H01Q 9/0457; H01Q 9/0478; H01Q 9/0485; H05K 1/147

See application file for complete search history.

(56) References Cited

U.S. PATENT DOCUMENTS

| | | | | |
|---|---|---|---|---|
| 9,065,175 | B2 | 6/2015 | Corbin et al. | |
| 9,583,825 | B2 | 2/2017 | Jung | |
| 10,455,065 | B2 | 10/2019 | Lee et al. | |
| 10,931,000 | B1 | 2/2021 | Kang et al. | |
| 11,089,677 | B2 | 8/2021 | Ryu et al. | |
| 2009/0009399 | A1 | 1/2009 | Gaucher et al. | |
| 2012/0067961 | A1 | 3/2012 | Mauricia | |
| 2020/0021016 | A1* | 1/2020 | Son ...................... | H01Q 21/065 |
| 2020/0127404 | A1 | 4/2020 | Seo et al. | |
| 2023/0199096 | A1* | 6/2023 | Yun ........................ | H01Q 21/08<br>455/566 |

FOREIGN PATENT DOCUMENTS

| | | |
|---|---|---|
| KR | 1020200045661 | 5/2020 |
| KR | 10-2137093 | 7/2020 |
| KR | 1020200131159 | 11/2020 |

* cited by examiner

ANTENNA AND ELECTRONIC DEVICE INCLUDING SAME

CROSS-REFERENCE TO RELATED APPLICATION(S)

This application is a bypass continuation application of International Application No. PCT/KR2022/000927, which was filed on Jan. 18, 2022, and is based on and claims priority under 35 U.S.C. § 119 to Korean Patent Application No. 10-2021-0007038, which was filed in the Korean Intellectual Property Office on Jan. 18, 2021, the entire disclosure of each of which is incorporated herein by reference.

BACKGROUND

1. Field

The disclosure relates generally to an electronic device including a high-frequency (e.g., ultra-wide band (UWB)) antenna.

2. Description of Related Art

A first electronic device (e.g., an initiator) may perform a positioning operation for locating a second electronic device (e.g., a responder) by performing high-frequency (e.g., UWB) communication with the second electronic device. For example, the first electronic device may calculate an angle of arrival (AoA) of a radio frequency (RF) signal received from the second electronic device using a high frequency antenna including at least two patch antennas, and determine the location of another electronic device using the AoA.

A high-frequency antenna may be implemented as a multi-layered flexible printed circuit board (FPCB). The multi-layered FPCB may include a layer in which patch antennas are provided, a layer in which a transmission line is provided, and a ground layer.

SUMMARY

An aspect of the disclosure is to provide an FPCB structure including a high-frequency antenna, which is easily disposed and assembled in an inner space of a housing of an electronic device.

Another aspect of the disclosure is to provide an electronic device that locates another electronic device by performing a positioning operation using a high-frequency antenna structure.

In accordance with an aspect of the disclosure, an electronic device is provided, which includes a circuit board, an electronic component arranged in a first direction from the circuit board, a metal member arranged in the first direction from the electronic component and disposed to overlap the electronic component, and an FPCB arranged in a first direction from a metal member, wherein the FPCB includes an antenna, a first portion in which the antenna is provided in the form of a patch antenna to overlap the metal member, a second portion coupled to a connector of the circuit board, and a third portion arranged between the first portion and the second portion. A layered structure of the FPCB may include a dielectric material having a first thickness in the first portion overlapping the metal member and having a second thickness smaller than the first thickness in the second portion and the third portion, a first conductive layer provided in the first direction from the dielectric material, and an intermediate conductive layer provided in a second direction opposite to the first direction, from the dielectric material. The intermediate conductive layer may be provided only in the second portion and the third portion and may not be provided in the first portion. A portion of the dielectric material in the first portion can be arranged to face the metal member.

In accordance with another aspect of the disclosure, an electronic device is provided, which includes a circuit board, an electronic component arranged in a first direction from the circuit board, a metal member arranged in the first direction from the electronic component and disposed to overlap and cover the electronic component, and an FPCB arranged in a first direction from a metal member, wherein the FPCB includes an antenna, a first portion in which the antenna is provided in the form of a patch antenna to overlap the metal member, a second portion coupled to a connector of the circuit board, and a third portion arranged between the first portion and the second portion. A layered structure of the FPCB may include a first conductive layer in which the patch antenna is provided, a second conductive layer providing a ground layer, and an intermediate layer arranged between the first conductive layer and the second conductive layer and having a thickness that is reduced in the third portion, and the intermediate layer may include a dielectric material that is at least partially removed in the third portion to provide a groove.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Hereinafter, various embodiments of the disclosure will be described with reference to the accompanying drawings.

The various embodiments of the disclosure and the terminology used are not intended to limit the technical features described herein to specific embodiments, but are to include various modifications, equivalents, and/or alternatives thereof.

In connection with the description of the drawings, similar reference symbols may be used for similar or related components.

The singular form of a noun corresponding to an item may include one or multiple instances of the item unless clearly indicated otherwise in a related context.

The expression "A or B", "at least one of A and B", "at least one of A or B", "A, B or C", "at least one of A, B and C", or "at least one of A, B or C" may include any one of the listed items or all possible combinations thereof. The terms "$1^{st}$" and "$2^{nd}$" or "first" and "second" may be used to simply distinguish one element from another element, without limiting corresponding elements in another aspect (e.g., importance or order).

An electronic device according to an embodiment can include various types of devices. For example, an electronic device may include a portable communication device (e.g., smartphone), a computer, a portable multimedia device, a portable medical instrument, a camera, a wearable device, and a home appliance, but is not limited to the above-described devices.

Figure 1:
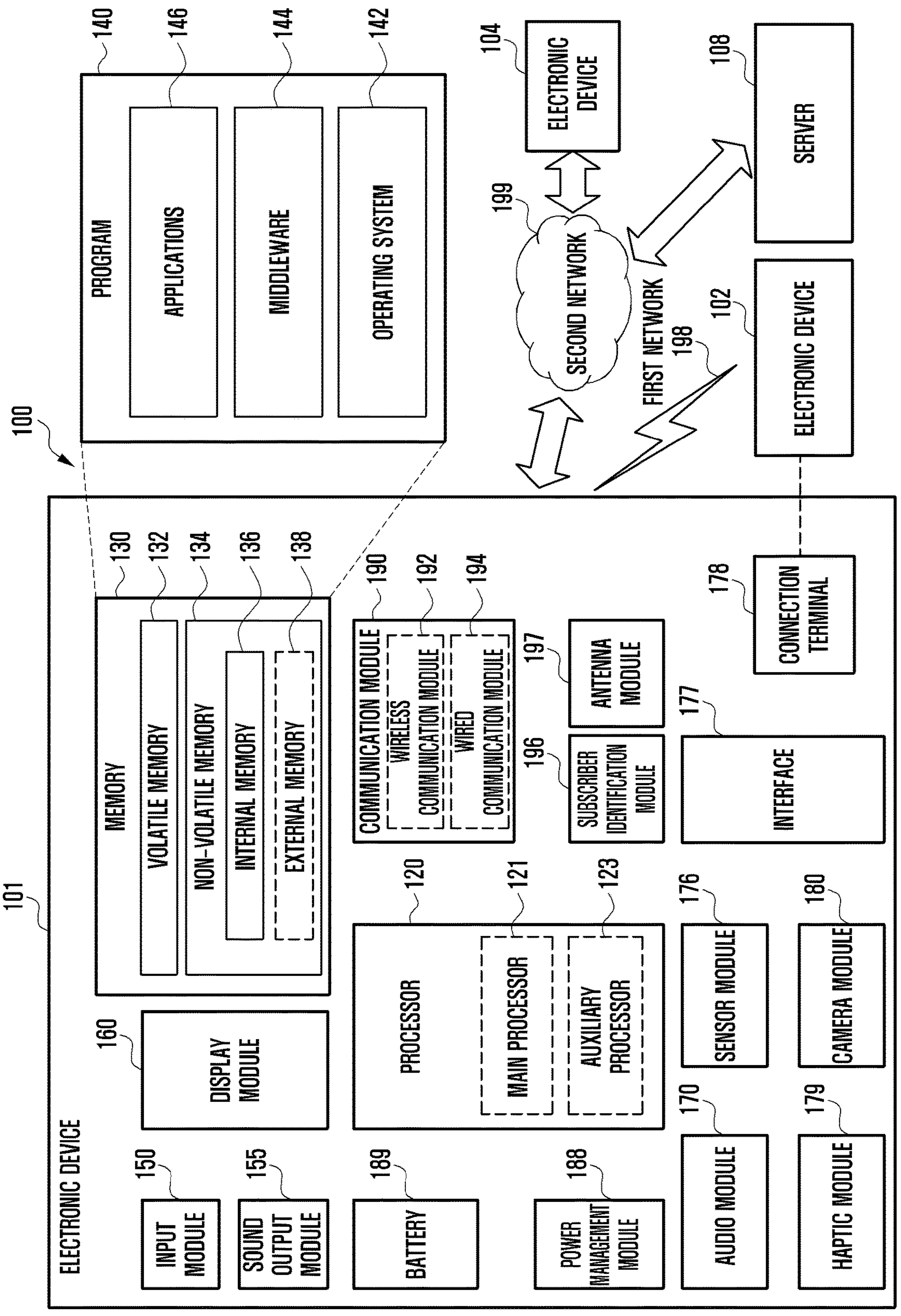
FIG. 1 illustrates an electronic device in a network environment according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the NPU) may include a hardware structure specified for artificial intelligence (AI) model processing. An AI model may be generated by machine learning. Such learning may be performed, e.g., by the electronic device 101 where the AI is performed or via a separate server (e.g., the server 108). Learning algorithms may include, but are not limited to, e.g., supervised learning, unsupervised learning, semi-supervised learning, or reinforcement learning. The AI model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent DNN (BRDNN), deep Q-network or a combination of two or more thereof but is not limited thereto. The AI model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101.

The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or IR data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., an RF integrated circuit (RFIC)) other than the radiating element may be additionally formed as part of the antenna module 197.

According to various embodiments, the antenna module 197 may form a mmWave antenna module. According to an embodiment, the mmWave antenna module may include a PCB, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Figure 2:
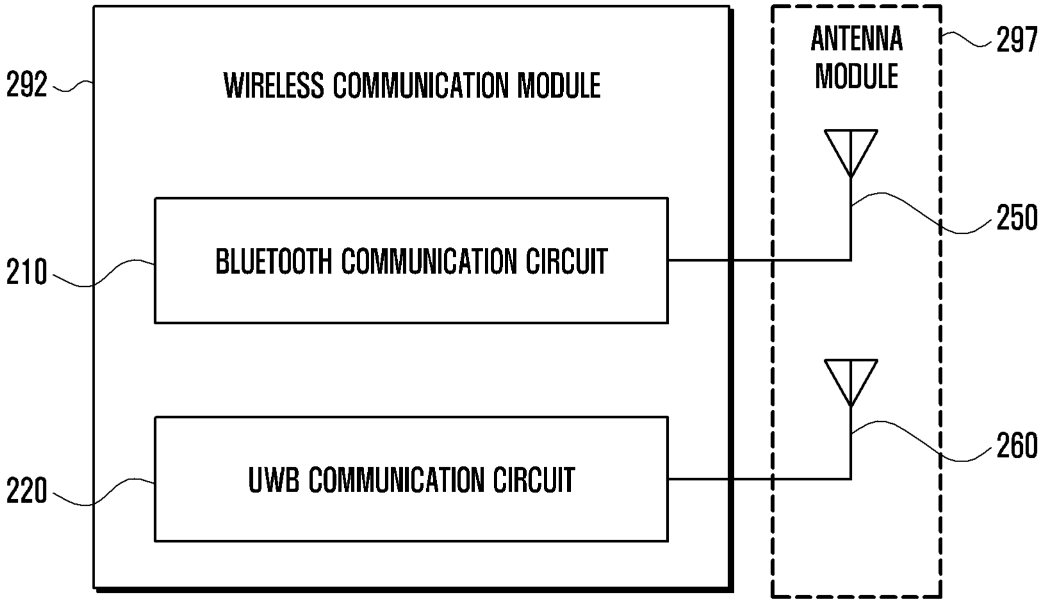
FIG. 2 illustrates a wireless communication module and an antenna module of an electronic device according to an embodiment.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added. FIG. 2 illustrates a wireless communication module and an antenna module of an electronic device according to an embodiment.

Referring to FIG. 2, the wireless communication module 292 includes a Bluetooth™ communication circuit 210 and a UWB communication circuit 220 (e.g., a high-frequency communication circuit). The antenna module 297 includes a Bluetooth™ antenna 250 connected to the Bluetooth™ communication circuit 210 and a UWB antenna 260 connected to the UWB communication circuit 220. The functions of at least one of the Bluetooth™ communication circuit 210 and the UWB communication circuit 220 may be controlled by a processor (e.g., an AP and/or a CP).

The Bluetooth™ communication circuit 210 may support establishment of a Bluetooth™ communication channel (or session) corresponding to a frequency band designated to be used for Bluetooth™ (e.g., Bluetooth™ low energy (BLE)) among bands to be used for wireless communication with an external electronic device. The Bluetooth™ communication circuit 210 may support Bluetooth™ communication with an external electronic device via the Bluetooth™ communication channel.

While transmitting, the Bluetooth™ communication circuit 210 may convert a baseband signal generated by and received from the processor into an RF signal of the Bluetooth™ band and transmit the RF signal to the outside via the Bluetooth™ antenna 250.

While receiving, the Bluetooth™ communication circuit 210 may acquire an RF signal of the Bluetooth™ band (e.g., about 2.4 GHz) via the Bluetooth™ antenna 250, convert the acquired RF signal into a signal of a baseband (e.g., several MHz or less), and transmit the converted signal to the processor.

The UWB communication circuit 220 may support establishment of a UWB communication channel (or session) corresponding to a frequency band designated to be used for UWB communication (e.g., about 3.1 to 10.6 GHz) among bands to be used for wireless communication with an external electronic device. The UWB communication circuit 220 may support UWB communication with an external electronic device via the UWB communication channel.

While transmitting, the UWB communication circuit 220 may convert a baseband signal generated by and received from the processor into an RF signal of the UWB band and transmit the RF signal to the outside via the UWB antenna 260.

While receiving, the UWB communication circuit 220 may acquire an RF signal of the UWB band via the UWB antenna 260, convert the acquired RF signal into a signal of a baseband, and transmit the converted signal to the processor.

The wireless communication module 292 may include a filter (e.g., a UWB band pass filter) that filters out the RF signal of the UWB band from the RF signal received from the UWB antenna 260 and transmits the RF signal of the UWB band to the UWB communication circuit 220.

The UWB antenna 260 may include a plurality of antennas. For example, the UWB antenna 260 may include a first antenna for transmitting/receiving an RF signal, a second antenna dedicated to receiving an RF signal, and/or a third antenna dedicated to receiving an RF signal.

Short range communication, such as Bluetooth™, may be used as a trigger for activating UWB communication. For example, BLE has relatively lower positioning accuracy than other short-distance communication technologies (e.g., UWB), but consumes less power, and has a long recognition distance (e.g., a distance at which an external electronic device 102 existing in the vicinity can be recognized). Thus, BLE may be used as a trigger to activate positioning communication.

More specifically, the processor may receive a signal for connection with an external electronic device (e.g., an advertising or broadcasting packet) from the external electronic device via the Bluetooth™ communication circuit 210. The external electronic device may transmit a signal as an advertiser (or a broadcaster), and the electronic device may periodically scan the signal as an observer. The processor may determine to activate positioning communication using UWB when the strength of a received signal (e.g., a received signal strength indicator (RSSI)) is greater than a predetermined threshold or when it is recognized that the strength of the signal is getting stronger. According to the determination, the processor may establish a UWB communication channel with the external electronic device (e.g., a second frequency band (e.g., ch5, an about 6.5 GHz band, or an about 6.25 to about 6.75 GHz) or a first frequency band (e.g., ch9, an about 8 GHz band, or an about 7.75 to 8.25 GHz) using the UWB communication circuit 220. For example, when the UWB communication circuit 220 is in a disabled state (e.g., a sleep state or a power off state), the processor may switch the UWB communication circuit 220 to an enabled state based on the determination, establish the UWB communication channel with the external electronic device using the UWB communication circuit 220, and perform positioning communication with the external electronic device via the established UWB communication channel.

Alternatively, the processor may establish a BLE communication channel with the external electronic device using the Bluetooth communication circuit 210. Based on the strength of the signal received from the external electronic device via the established BLE communication channel (e.g., when the strength is greater than a predetermined threshold or when the strength of the signal is getting stronger), the processor may determine to activate the positioning communication using UWB. The processor may establish a UWB communication channel with the external electronic device using the UWB communication circuit 220 according to the determination, and perform positioning communication with the external electronic device via the established UWB communication channel.

The use of the Bluetooth™ communication circuit 210 and Bluetooth™ antenna 250 is illustrated only as an example in FIG. 2, and communication technologies other than Bluetooth™ (e.g., Wi-Fi) may be used as a trigger for activating positioning communication.

Figure 3A:
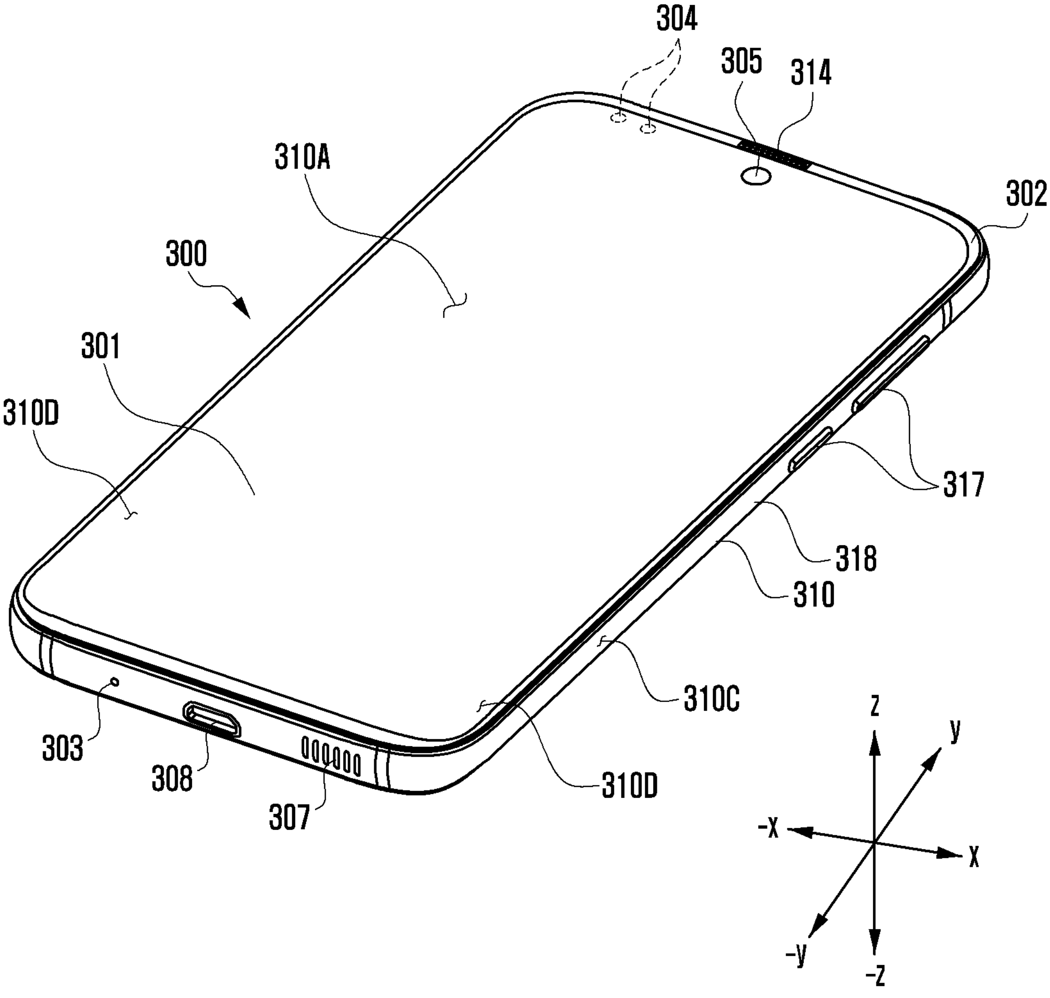
FIG. 3A illustrates a front view of an electronic device according to an embodiment.
Figure 3B:
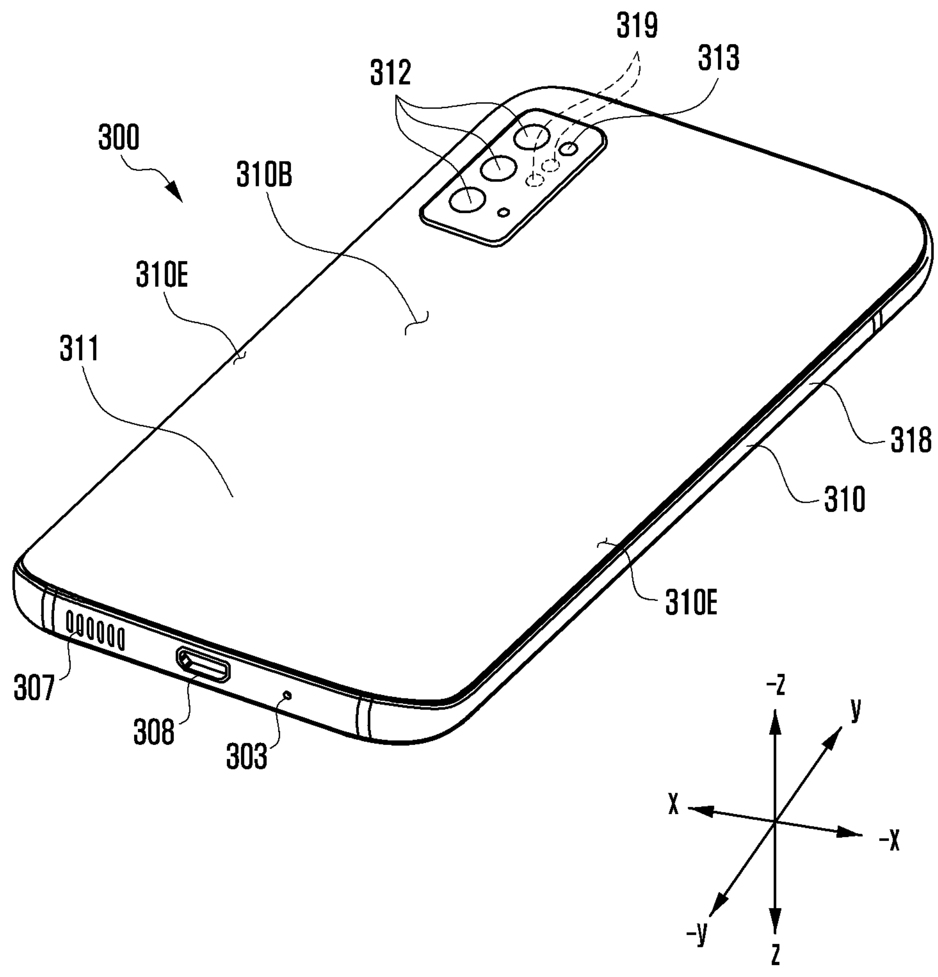
FIG. 3B illustrates a rear view of an electronic device according to an embodiment.

FIG. 3A illustrates a front view of an electronic device according to an embodiment. FIG. 3B illustrates a rear view of an electronic device according to an embodiment.

Referring to FIGS. 3A and 3B, an electronic device 300 includes a housing 310 including a first surface (or a front surface) 310A, a second surface (or a rear surface) 310B, and a side surface 310C surrounding a space between the first surface 310A and the second surface 310B. The housing may also refer to a structure defining a part of the first surface 310A, the second surface 3101B, and the side surface 310C. At least a portion of the first surface 310A may be defined by a substantially transparent front plate 302 (e.g., a glass plate or a polymer plate including various coating layers). The second surface 310B may be defined by a substantially opaque rear plate 311. The rear plate 311 may be made of coated or colored glass, ceramic, polymer, metal (e.g., aluminum, stainless steel (SUS), or magnesium), or a combination of two or more of these materials. The side surface 310C may be defined by a side bezel structure 318 (or a "side member") coupled to the front plate 302 and the rear plate 311 and including a metal and/or a polymer. Alternatively, the rear plate 311 and the side bezel structure 318 may be integrally configured, and may include the same material (e.g., a metal material such as aluminum).

The front plate 302 includes, at the opposite ends of long edges thereof, first areas 310D, which are bent from the first surface 310A toward the rear plate and extend seamlessly.

The rear plate 311 includes, at the opposite ends of the long edges thereof, second areas 310E, which are bent from the second surface 310B toward the front plate and extend seamlessly.

Alternatively, the front plate 302 or the rear plate 311 may include only one of the first areas 310D or the second areas 310E, and/or the front plate 302 may not include the first areas and the second areas, and may include only a flat surface arranged parallel to the second surface 310B.

When viewed from a side of the electronic device 300, the side bezel structure 318 may have a first thickness (or width) on the side surface side at which the first areas 310D or the second areas 310E are not included, and may have a second thickness, which is smaller than the first thickness, on the side surface side at which the first areas 310D or the second areas 310E are included.

The electronic device 300 includes a display 301, an input device 303, sound output devices 307 and 314, sensor modules 304 and 319, camera modules 305 and 312, a key input device 317, an indicator, and a connector 308. Alternatively, at least one of the components (e.g., the key input device 317 or the indicator) may be omitted from the electronic device 300, and/or other components may be additionally included.

The display 301 may be exposed through a substantial portion of the front plate 302. At least a portion of the display 301 may be exposed through the front plate 302 defining the first surface 310A and the first areas 310D of the side surface 310C. The display 301 may be coupled to or disposed adjacent to a touch-sensitive circuit, a pressure sensor capable of measuring touch intensity (pressure), and/or a digitizer configured to detect a magnetic-field-type stylus pen. At least some of the sensor modules 304 and 319 and/or at least some of the key input devices 317 may be disposed in the first areas 310D and/or the second areas 310E.

The input device 303 may include a microphone 303. The input device 303 may include a plurality of microphones 303 arranged to sense the direction of sound.

The sound output devices 307 and 314 may include speakers 307 and 314. The speakers 307 and 314 may include an external speaker 307 and a phone call receiver 314.

The microphone 303, the speakers 307 and 314, and the connector 308 may be at least partially arranged in the internal space of the electronic device 300, and may be exposed to the external environment through at least one hole provided in the housing 310. The hole provided in the housing 310 may be commonly used for the microphone 303 and the speakers 307 and 314. The sound output devices 307 and 314 may include a speaker that operates without a separate speaker hole formed in the housing 310 (e.g., a piezo speaker).

The sensor modules 304 and 319 may generate electrical signals or data values corresponding to the internal operating state or the external environmental state of the electronic device 300. The sensor modules 304 and 319 may include a first sensor module 304 (e.g., a proximity sensor) and/or a second sensor module (e.g., a fingerprint sensor) disposed on the first surface 310A of the housing 310, and/or a third sensor module 319 (e.g., a heart rate monitor (HRM) sensor) disposed on the second surface 310B of the housing 310. The fingerprint sensor may be arranged on the first surface 310A of the housing 310 (e.g., a home key button), in a partial area of the second surface 310B, and/or under the display 301.

The electronic device 300 may also include at least one other sensor module, such as a gesture sensor, a gyro sensor, an atmospheric pressure sensor, a magnetic sensor, an acceleration sensor, a grip sensor, a color sensor, an IR sensor, a biometric sensor, a temperature sensor, a humidity sensor, a proximity sensor, or an illuminance sensor.

The camera modules 305 and 312 may include a first camera module 305 arranged on the first surface 310A of the electronic device 300, a second camera module 312 arranged on the second surface 310B, and/or a flash 313. The camera modules 305 and 312 may include one or more lenses, an image sensor, and/or an ISP. The flash 313 may include a light-emitting diode (LED) or a xenon lamp. Two or more lenses (e.g., a wide-angle lens, a super-wide-angle lens, and a telephoto lens) and image sensors may be arranged on one surface of the electronic device 300.

The key input devices 317 may be arranged on the side surface 310C of the housing 310. Alternatively, the electronic device 300 may not include some or all of the above-mentioned key input devices 317, and a non-included key input device 317 may be implemented in another form such as a soft key on the display 301. The key input devices 317 may also be implemented using a pressure sensors included in the display 301.

The indicator may be arranged on the first surface 310A of the housing 310. The indicator may provide the status information of the electronic device 300 in an optical form (e.g., a light-emitting element). The light-emitting element may provide a light source that is interlocked with the operation of the camera module 305. The indicator may include an LED, an IR LED, and/or a xenon lamp.

The connector holes 308 may include a first connector hole 308, which is capable of accommodating a connector (e.g., a USB connector) for transmitting/receiving power and/or data to/from an external electronic device, and/or a second connector hole, which is capable of accommodating a connector (or an earphone jack) for transmitting/receiving an audio signal to/from an external electronic device.

Some of the camera modules 305 and 312 (e.g., the camera module 305), some of the sensor modules 304 and 319 (e.g., the sensor module 304), or the indicator may be arranged to be exposed through the display 301. For example, the camera module 305, the sensor module 304, or the indicator may be arranged in the internal space in the electronic device 300 to be in contact with the external environment through a through hole perforated in the display 301 up to the front plate 302.

Some sensor modules 304 may be arranged in the internal space in the electronic device to implement the functions thereof without being visually exposed through the front plate 302. For example, the area of the display 301 facing the sensor modules may not need a through hole.

Figure 3C:
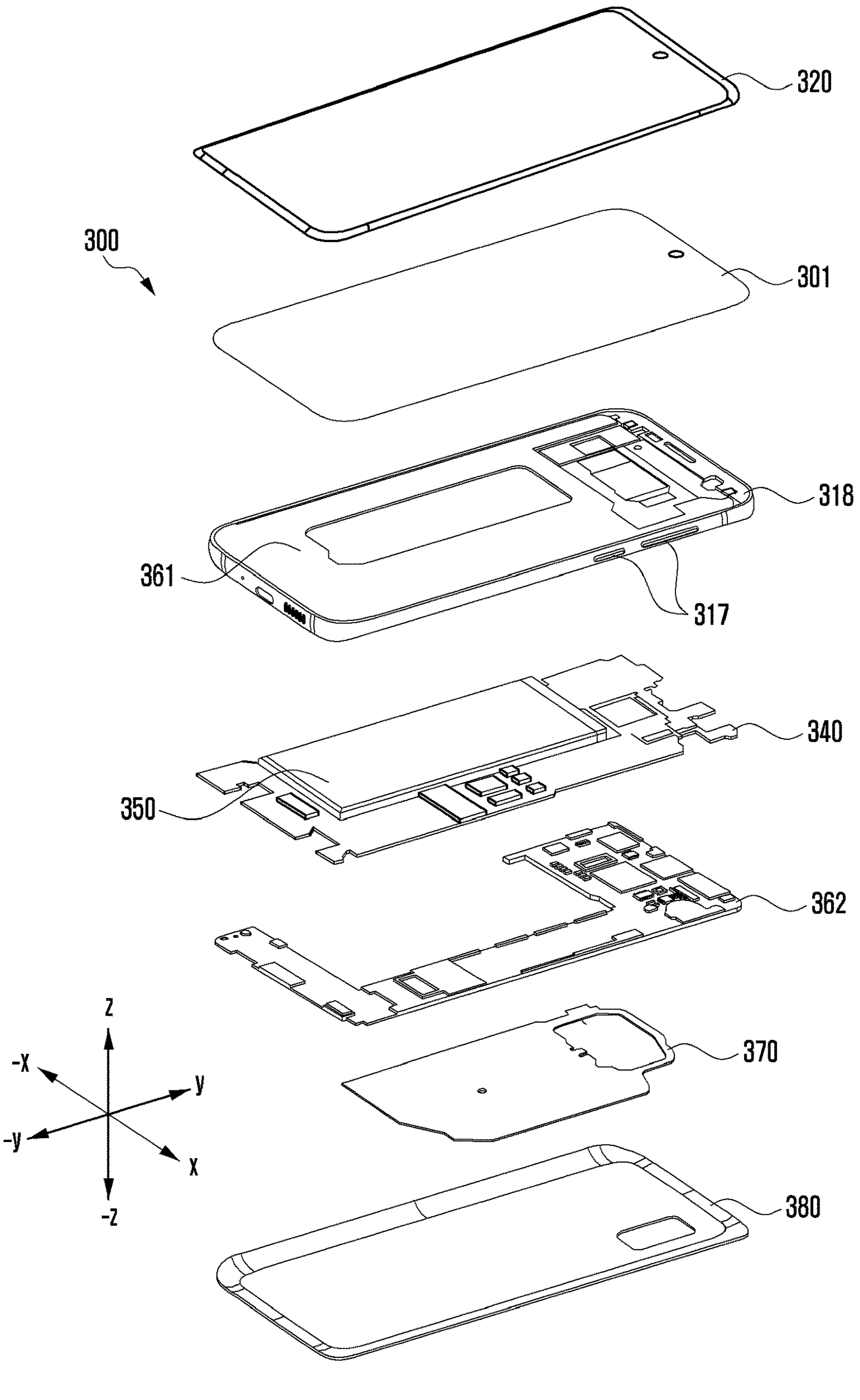
FIG. 3C illustrates an exploded view of an electronic device according to an embodiment.

FIG. 3C illustrates an exploded view of an electronic device according to an embodiment.

Referring to FIG. 3C, the electronic device 300 includes a side member 318 (e.g., a side bezel structure), a first support member 361 (e.g., a bracket or support structure), a front plate 320 (e.g., a front cover), a display 301, a substrate 340 (e.g., a PCB, an FPCB, or a rigid-FPCB (RFPCB), a battery 350, a second support member 362 (e.g., a rear case), an antenna 370, and a rear plate 380 (e.g., a rear cover). Alternatively, at least one of the components (e.g., the first support member 361 or the second support member 362) may be omitted from the electronic device 300, and/or other components may be additionally included.

The first support member 361 may be disposed inside the electronic device 300, and may be connected to the side member 318 or may be formed integrated with the side member 318. The first support member 361 may be formed of a metal material and/or a non-metal (e.g., polymer) material. The first support member 361 may include one surface to which the display 301 is coupled and the other surface to which the substrate 340 is coupled. A processor, a memory, and/or an interface may be mounted on the substrate 340. The processor may include one or more of a CPU, an AP, a graphics processor, an ISP, a sensor hub processor, or a CP.

The memory may include a volatile memory and/or a nonvolatile memory.

The interface may include an HDMI, a USB interface, an SD card interface, and/or an audio interface. The interface may electrically or physically connect the electronic device 300 to an external electronic device and may include a USB connector, an SD card/multimedia card (MMC) connector, or an audio connector.

The battery 350 supplies power to at least one component of the electronic device 300, and may include a non-rechargeable primary battery, a rechargeable secondary battery, and/or a fuel cell. At least a portion of the battery 350 may be disposed to be substantially flush with the substrate 340. The battery 350 may be integrally arranged inside the electronic device 300, or may be arranged to be detachable from/attachable to the electronic device 300.

The antenna 370 may be arranged between the rear plate 380 and the battery 350. The antenna 370 may include a near field communication (NFC) antenna, a wireless charging antenna, and/or a magnetic secure transmission (MST) antenna. The antenna 370 may be used to perform short-range communication with an external device or transmit/receive power for charging to/from an external device in a wireless manner. An antenna structure may also be provided by a part of the side member 318 and/or the first support member 361.

Although FIGS. 3A to 3C illustrate a bar-type housing structure of the electronic device, the embodiments of the disclosure may not be limited thereto. For example, an electronic device may be a foldable electronic device such as the Galaxy Z Fold™ and/or the Galaxy Z Flip™.

Figure 4:
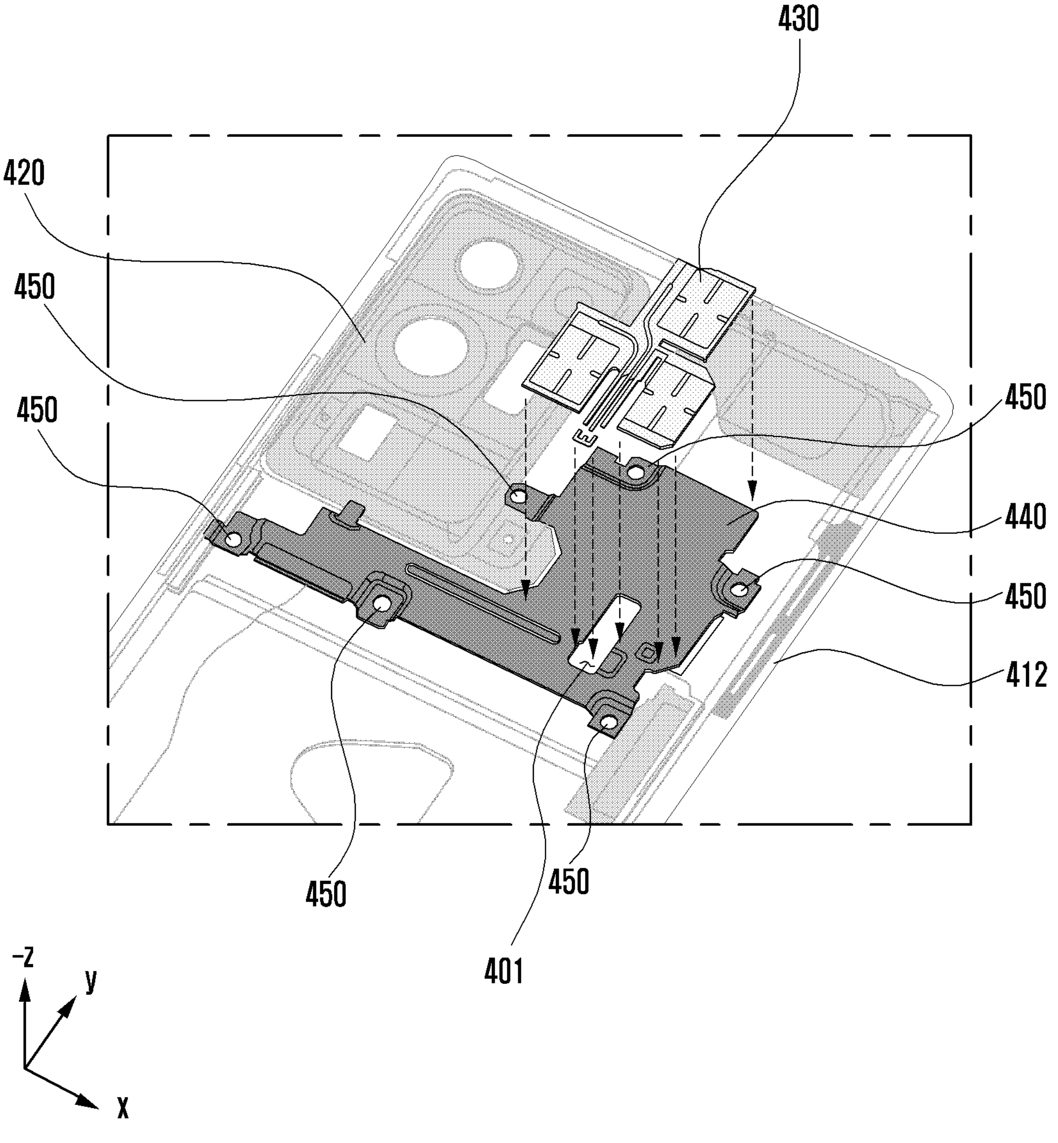
FIG. 4 illustrates an arrangement of a UWB antenna in an electronic device having a bar-type housing structure, according to an embodiment.

FIG. 4 illustrates an arrangement of a UWB antenna in an electronic device having a bar-type housing structure, according to an embodiment.

Referring to FIG. 4, a surface on which a display of the electronic device is arranged may be defined as a front surface of the electronic device, the opposite surface may be defined as a rear surface of the electronic device, and the surfaces surrounding the space between the front and rear surfaces may be defined as the side surfaces of the electronic device. As such, FIG. 4 illustrates a rear view of the electronic device with a rear cover removed.

The electronic device includes a housing 410, a camera cover 420, a UWB antenna 430, and a support member 440.

The housing 410 may include a front cover, a rear cover and a side frame 412.

The UWB antenna 430 and the support member 440 are arranged inside the housing 410. The camera cover 420 is a cover of the camera module arranged inside the housing 410 and decorates the camera module. The camera cover may be made of a metal or a polymer.

The UWB antenna 430 may be arranged inside the housing 410 not to overlap the camera module when viewed from the rear side. The UWB antenna 430 is electrically separated from the camera cover 420, and may be disposed between the rear cover 411 and the support member 440.

The support member 440 may be disposed between the UWB antenna 430 and a substrate (e.g., a PCB). The UWB antenna 430 may be arranged on the support member 440. The support member 440 may be implemented using a metal (e.g., SUS) or a polymer.

The support member 440 includes holes 450 provided to fix the support member inside the housing 410 using fixing members (e.g., screws). The support member 440 may be electrically connected to the side frame 412 (e.g., a metal body) via, for example, screws. The UWB antenna 430 may be implemented as an FPCB including multiple layers and may be electrically connected to a UWB communication circuit provided on a substrate when a connector of the FPCB is fastened to the substrate.

The support member 440 includes a hole 401 that passes through at least a portion of the support member. The hole 401 may provide a path into which the connector of the UWB antenna 430 implemented as the FPCB is inserted. For example, the connector of the UWB antenna 430 implemented as the FPCB may pass through the hole 401 in the support member 440 and be fastened to the substrate.

Figure 5:
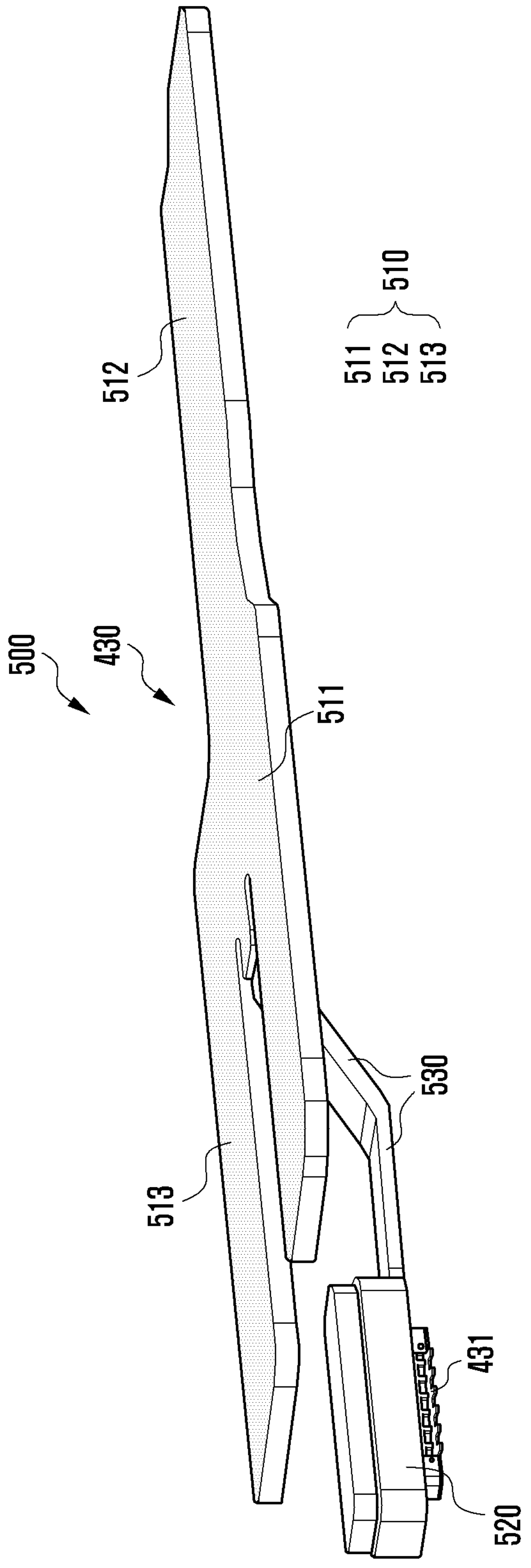
FIG. 5 illustrates a UWB antenna implemented as an FPCB according to an embodiment.

FIG. 5 illustrates a UWB antenna implemented as an FPCB according to an embodiment.

Referring to FIG. 5, wherein a UWB antenna 430 is implemented in the form of an FPCB 500, the FPCB 500 includes a first portion 510 in which the UWB antenna 430 is arranged, a second portion 520 in which a connector is arranged, and a third portion 530 arranged to connect the first portion 510 and the second portion 520 to each other and to pass through a hole in a support member (e.g., the hole 401 and the support member 440 in FIG. 4).

The first portion 510 includes a first antenna area 511 in which a first patch antenna is arranged, a second antenna area 512 in which a second patch antenna is arranged, and a third antenna area 513 in which a third patch antenna is arranged.

The third portion 530 of the FPCB 500 may have more flexibility than the first portion 510 and the second portion 520. For example, the third portion 530 of the FPCB 500 may be relatively thinner than the first portion 510 and the second portion 520. For example, the third portion 530 of the FPCB 500 may be designed to be relatively thin, so that at least a portion thereof can be easily folded or bent.

Since the FPCB 500 is assembled such that at least a portion of the third portion 530 passes through the hole in the support member, the connector arranged on the second portion 520 may be fastened to the substrate of the electronic device.

Figure 6:
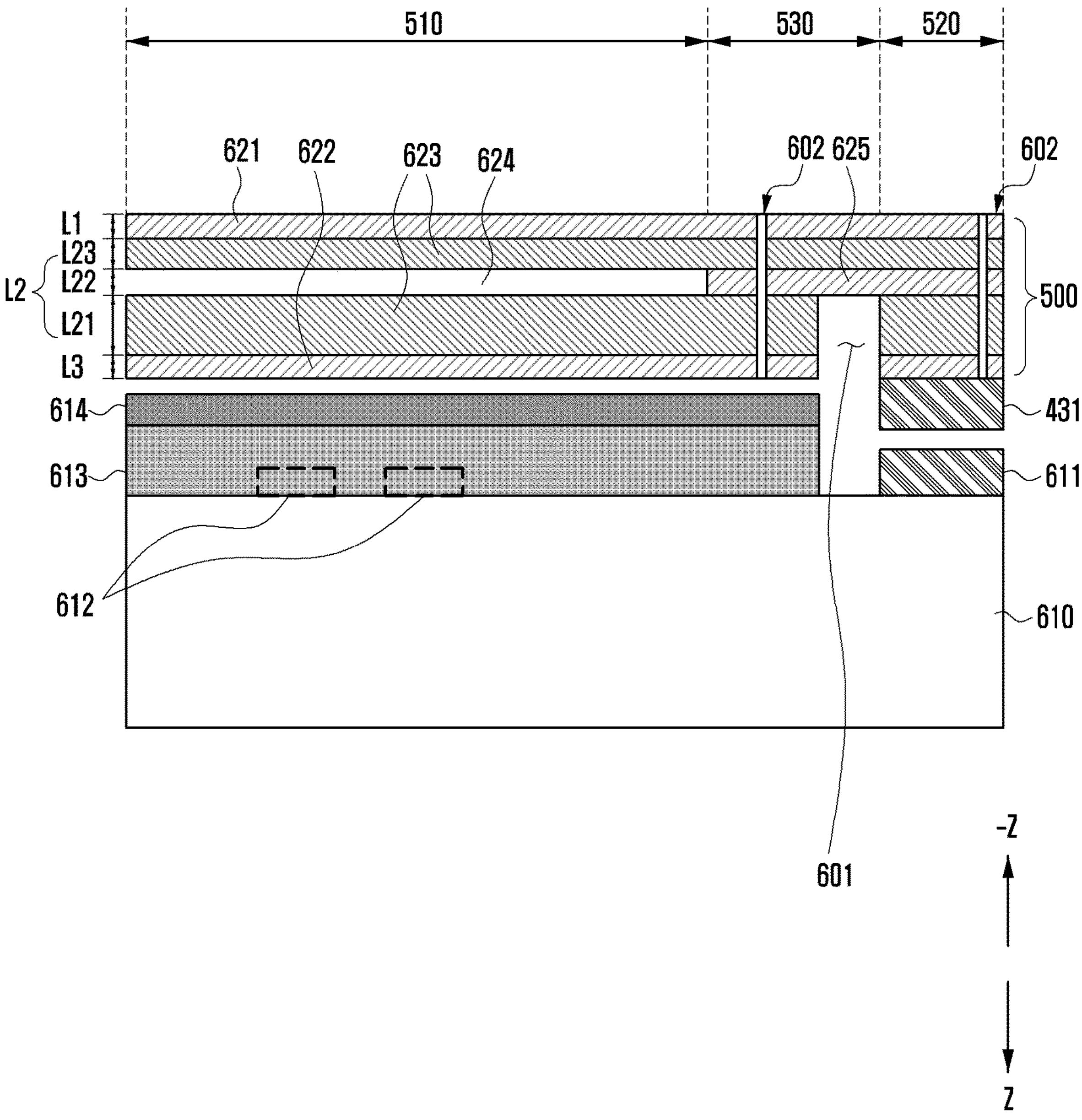
FIG. 6 illustrates a cross-sectional view of an electronic device including a UWB antenna according to an embodiment.

FIG. 6 illustrates a cross-sectional view of an electronic device including a UWB antenna according to an embodiment.

Referring to FIG. 6, an electronic device includes a substrate 610, and an FPCB 500, which may include a UWB antenna, fastened to at least a portion of the substrate 610 by a connector.

The electronic device also includes electronic components 612 arranged in a first direction (the −z direction) from the substrate 610. The electronic components 612 may include one or more of a memory, a CPU, an AP, a graphics processor, an ISP, a sensor hub processor, and a CP. Alternatively, an electronic component 612 may be a single component incorporating one or more of a CPU, an AP, a graphics processor, an ISP, a sensor hub processor, or a CP.

The electronic device includes a shield can 613 arranged in the first direction (the −z direction) from the electronic component 612 to cover the electronic component 612. The shield can 613 may be arranged to overlap the electronic component 612 and a portion of the substrate 610 adjacent to the electronic component 612, whereby the electronic component 612 can be cased to be visually invisible from the outside. The shield can 613 may include a metal material, thereby providing a function of blocking electromagnetic waves generated from the electronic component 612 and a heat dissipation function. A thermal interface material (TIM) may be attached to at least a portion of the shield can 613.

The electronic device includes a metal member 614 arranged in the first direction (the −z direction) from the electronic component 612 to be in contact with the surface of the FPCB 500. For example, the metal member 614 may be a support member, similar to the support member 440 described above with reference to FIG. 4. The metal member 614 may include SUS.

Alternatively, the shield can 613 or the metal member 614 may be omitted from the electronic device.

The electronic device includes the FPCB 500 that is arranged in the first direction (the −z direction) from the metal member 614.

The FPCB 500 include the first portion 510 in which the UWB antenna is arranged, the second portion 520 in which a connector 431 fastened to a main connector 611 of the substrate 610, and the third portion 530, which is arranged to connect the first portion 510 and the second portion 520 to each other and passes through a hole in the metal member 614.

The FPCB 500 includes a multi-layer structure. More specifically, the FPCB 500 includes a first conductive layer L1 in which the UWB antenna implemented in the form of a patch antenna and transmission lines are provided, a second conductive layer L3 arranged in the second direction (the z-direction) from the first conductive layer L1 to face the metal member 614, and an intermediate layer L2 arranged between the first conductive layer L1 and the second conductive layer L3.

In the first conductive layer L1 includes patch antennas 621 and transmission lines, which connect respective patch antennas 621 to a UWB communication circuit.

A ground pattern 622, which at least partially overlaps the patch antennas 621 provided in the first conductive layer L1, may be provided in the second conductive layer L3 of the FPCB 500. The ground pattern 622 may provide a common ground of the patch antennas 621. The patch antennas 621 and the ground pattern 622 may operate as resonators for transmitting an RF signal of a specific frequency band to the outside and receiving an RF signal of the specific frequency band. The RF signal of the specific frequency band may include an RF signal of a first frequency band (e.g., ch9 or an about 8 GHz band) and a second frequency band (e.g., ch5 or an about 6.5 GHz band).

A dielectric material 623 (e.g., polyimide), an adhesive 624, and an intermediate conductive layer 625 may be provided in the intermediate layer L2 of the FPCB 500.

The intermediate layer L2 of the FPCB 500 includes a first intermediate layer L21, which is arranged in a first direction (the −z direction) from the second conductive layer L3 and in which the dielectric material 623 is provided, a second intermediate layer L22, which is arranged in the first direction (the −z direction) from the first intermediate layer L21 and in which the adhesive 624 and the intermediate conductive layer 625 is provided, and a third intermediate layer L23, which is arranged in the first direction (the −z direction) from the second intermediate layer L22 and in which the dielectric material 623 is provided.

The dielectric material 623 of the first intermediate layer L21 is provided to correspond to the first portion 510 and the second portion 520 of the FPCB 500, and is at least partially removed in the third portion 530 of the FPCB 500 to provide a groove 601 in the FPCB 500. The groove 601 in the FPCB 500 may be provided by at least partially removing the dielectric material 623 of the first intermediate layer L21 in the third portion 530 of the FPCB 500.

The third portion 530 of the FPCB 500 may be designed to be relatively thinner than the first portion 510 and the second portion 520 by including the groove 601. Accordingly, the FPCB 500 including the UWB antenna may provide a structure that is easily assembled. For example, the intermediate layer L2 may be arranged between the first conductive layer L1 and the second conductive layer L3 and may have a thickness that is reduced in the third portion.

The second intermediate layer L22 includes the adhesive 624 arranged to correspond to the first portion 510 of the FPCB 500. Alternatively, in the second intermediate layer L22, a dielectric material may be provided in place of the adhesive 624 corresponding to the first portion 510.

The second intermediate layer L22 includes the intermediate conductive layer 625 arranged to correspond to the second portion 520 and the third portion 530 of the FPCB 500. The intermediate conductive layer 625 may include an intermediate ground pattern electrically connected to the second conductive layer L3 via a conductive via 602. The intermediate conductive layer 625 provided in at least a portion of the second intermediate layer L22 may be electrically connected to the ground pattern 622 provided in the second conductive layer L3, thereby providing a ground path of the FPCB 500.

As illustrated in FIG. 6, the FPCB 500 may be configured as a three-layer structure including the first conductive layer L1, the second conductive layer L3, and the intermediate layer L2, and by providing the groove 601 in the third portion 530 of the FPCB 500 that is folded or bent for assembly of the connector 431 of the FPCB 500, flexibility characteristics can be increased and assembly can be facilitated.

Figure 7:
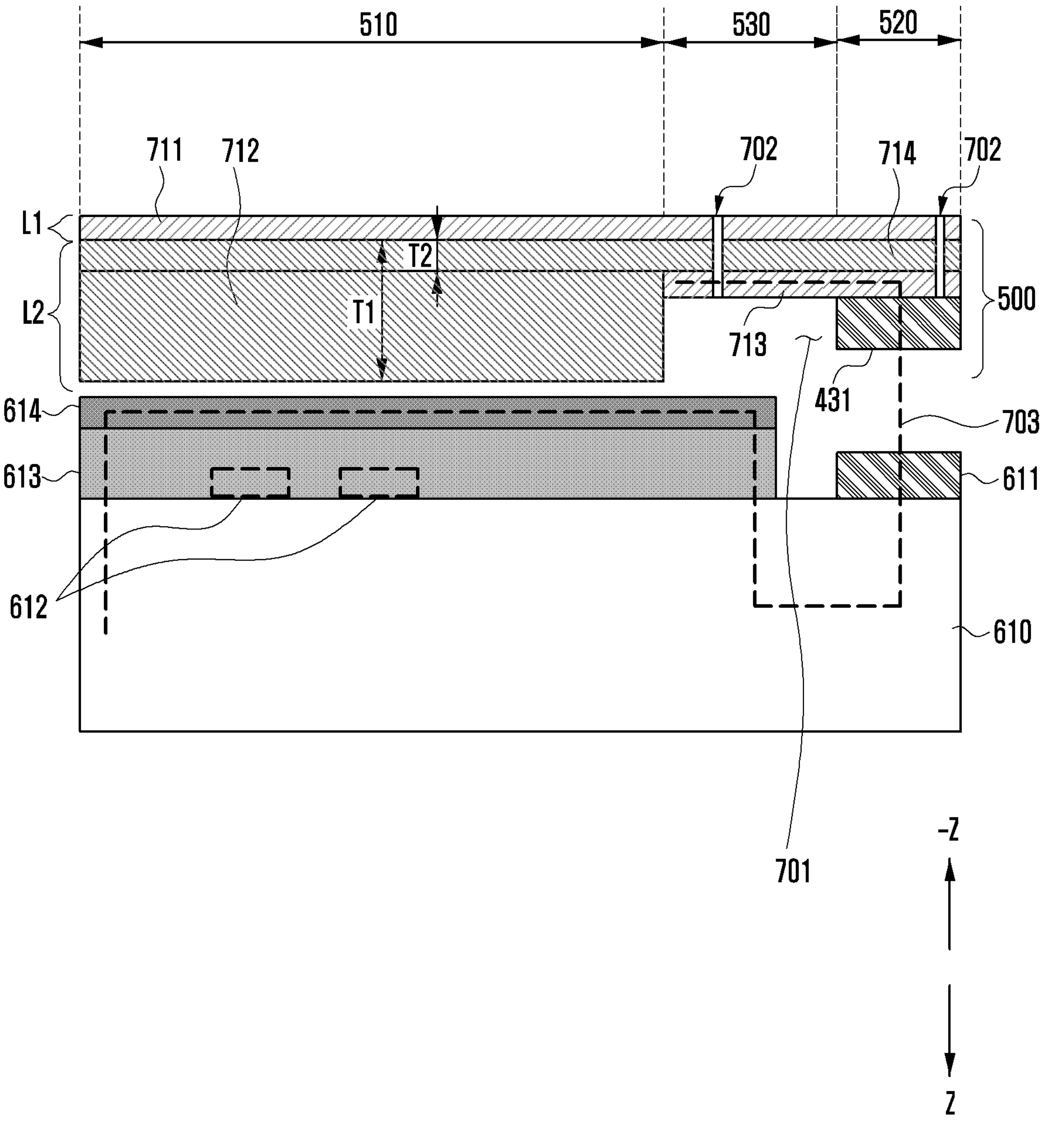
FIG. 7 illustrates a cross-sectional view of an electronic device including a UWB antenna according to an embodiment.

FIG. 7 illustrates a cross-sectional view of an electronic device including a UWB antenna according to an embodiment.

Referring to FIG. 7, the electronic device, different from FIG. 6, includes an FPCB including two layers L1 and L2. That is, the second conductive layer L3 of FIG. 6 is removed, and the thickness of dielectric material 712 is increased in the first portion 510 of the FPCB 500.

In L2 of the FPCB 500, the surface of the dielectric material 712 is arranged to face the surface of the metal member 614.

In the second direction (z-direction) from the FPCB 500 in which the UWB antenna is implemented in the form of a patch antenna, a metal component, such as a metal member 614 and/or a shield can 613, is arranged, and the metal component is electrically connected to a main ground of the substrate 610. Accordingly, the patch antenna of the FPCB 500 may be operable even when the second conductive layer L3 of FIG. 6, which serves as a separate ground layer, is removed. For example, in the FPCB 500 in FIG. 7, the ground path may be provided as indicated by the dashed line 703.

In the first conductive layer L1 of the FPCB 500, patch antennas 711 and transmission lines, which connect respective patch antennas to a UWB communication may be provided.

When the second conductive layer L3 of FIG. 6, serving as a ground layer in the FPCB 500 is removed, the FPCB 500 may be designed such that the thickness of the second conductive layer L2 increases by the thickness of the intermediate layer in which the dielectric material 623 is provided in layer L3 of FIG. 6. When the thickness of the dielectric between the patch antennas 711 and the ground layer is increased, an antenna gain (e.g., antenna efficiency) and a bandwidth may be increased.

In FIG. 7, the FPCB 500 includes the first portion 510 in which the UWB antenna 430 is arranged, the second portion 520 in which the connector 431 is fastened to a main connector 611 of the substrate 610, and the third portion 530, which is arranged to connect the first portion 510 and the second portion 520 to each other and pass through a hole in the metal member 614.

The FPCB 500 includes a first conductive layer L1 in which a UWB antenna implemented in the form of the patch antennas 711 and transmission lines are provided, and an intermediate layer L2 arranged in the second direction (z direction) from the first conductive layer L1 to face the metal member 614.

In the first conductive layer L1, patch antennas 711 and transmission lines, which connect respective patch antennas 711 to a UWB communication circuit may be provided.

Dielectric materials 712 and 714 and an intermediate conductive layer 713 are be provided in the intermediate layer L2 of the FPCB 500. The dielectric materials 712 and 714 of the intermediate layer L2 have a first thickness T1 in the first portion 510 of the FPCB 500 and may be arranged to face the surface of the metal member 614. The dielectric materials 712 and 714 of the intermediate layer L2 have a second thickness T2, i.e., smaller than the first thickness T1, in the second portion 520 and the third portion 530 of the FPCB 500. A first dielectric material 712 having the first thickness T1 is arranged in the first portion 510 of the FPCB 500, and a second dielectric material 714 having a second thickness T2 may be arranged in the second portion 520 and the third portion 530 of the FPCB 500.

The intermediate layer L2 of the FPCB 500 includes the intermediate conductive layer 713 arranged to correspond to the second portion 520 and the third portion 530. The intermediate conductive layer 713 may be arranged in the second direction (the z-direction) from the second dielectric material 714. The intermediate conductive layer 713 may include an intermediate ground pattern electrically connected to the main ground of the substrates 610 via a conductive via 702 and a connector 431 of the FPCB 500.

The thickness of the first dielectric material 712 arranged in the first portion 510 of the FPCB 500 may be greater than the sum of the thickness of the intermediate conductive layer 713 arranged in the second portion 520 and the third portion 530 and the thickness of the second dielectric material 714.

As illustrated in FIG. 7, the FPCB 500 may be configured in a two-layer structure including a first conductive layer L1 and an intermediate conductive layer L2, which make it possible to reduce the material cost compared to a three-layer structure as illustrated in FIG. 6.

In the FPCB 500 of FIG. 7, by providing a groove 701 in the third portion 530 of the FPCB 500 that is folded or bent for assembly of the connector 431 of the FPCB 500, flexibility characteristics can be increased and assembly can be facilitated.

In the FPCB 500 of FIG. 7, by increasing the thickness of the first dielectric material 712, while removing the second conductive layer L3 serving as a ground layer, the antenna gain (e.g., antenna efficiency) and bandwidth can be increased.

Figure 8:
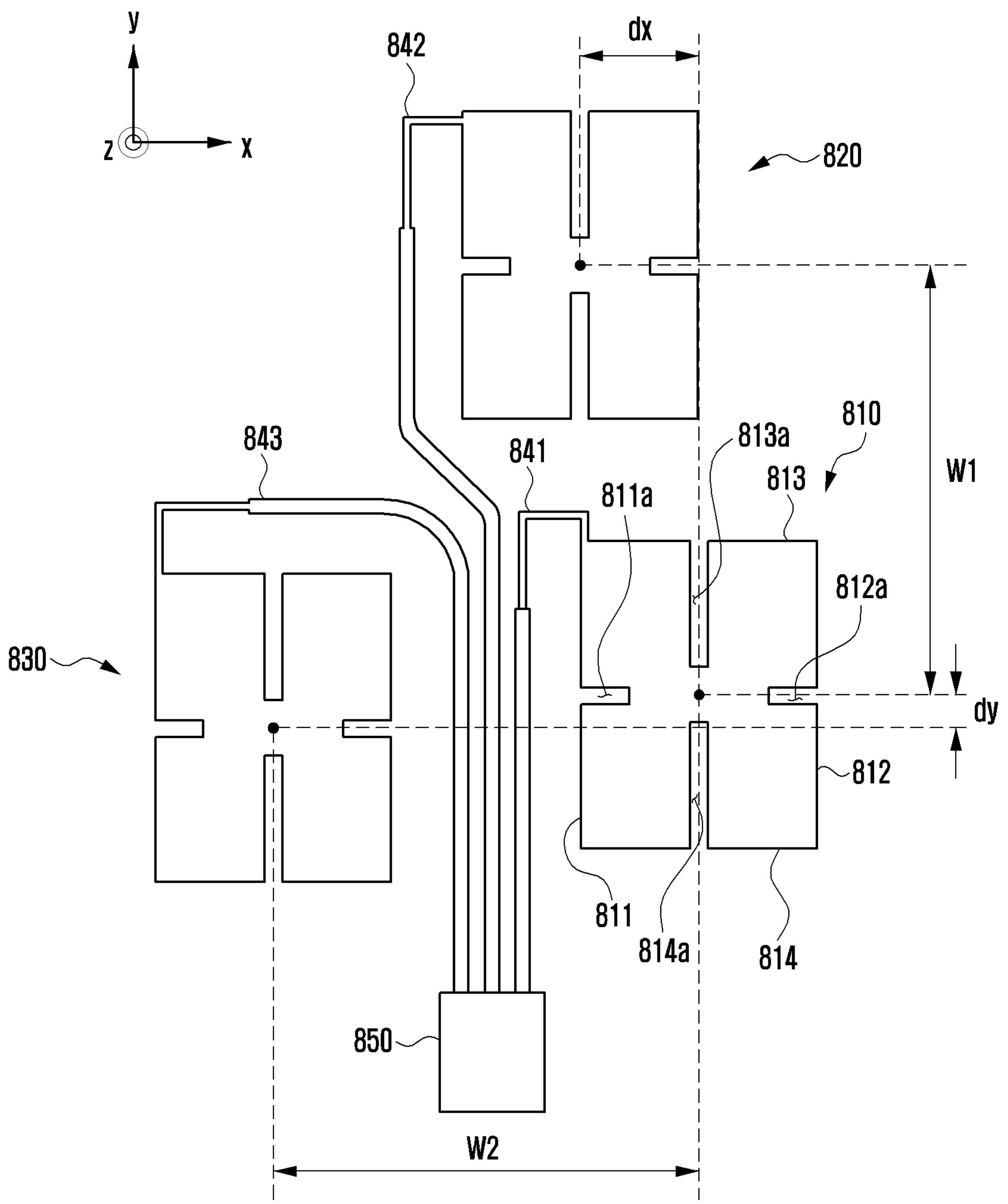
FIG. 8 illustrates a UWB antenna according to an embodiment.

FIG. 8 illustrates a UWB antenna according to an embodiment.

Referring to FIG. 8, a first conductive layer of an FPCB includes a first patch antenna 810, a second patch antenna 820, a third patch antenna 830, a first transmission line 841, a second transmission line 842, and a third transmission line 843. One of the patch antennas 810, 820, and 830 (e.g., the first patch antenna 810) may be used as an antenna for transmitting/receiving UWB signals, and the other two (e.g., the second patch antenna 820 and the third patch antenna 830) may be used as antennas for receiving UWB signals.

The transmission lines 841, 842, and 843 may be provided in the same layer as the patch antennas 810, 820, and 830. The transmission lines 841, 842, and 843 include a first transmission line 841 connecting a connector 850 and the first patch antenna 810 to each other, a second transmission line 842 connecting the connector 850 and the second patch antenna 820 to each other, and a third transmission line 843 connecting the connector 850 and the third patch antenna 830 to each other.

To measure an angle in the y-axis direction (e.g., the elevation angle of AoA), the first patch antenna 810 and the second patch antenna 820 may be arranged in a first direction (the y-axis direction) not to overlap each other when viewed from the rear side (x-y plane). For example, the second patch antenna 820 may be arranged to be spaced apart from the first patch antenna 810 in the first direction (y-axis direction) without overlapping the first patch antenna 810.

The second patch antenna 820 may have substantially the same shape and size as the first patch antenna 810.

The center of the first patch antenna 810 may be spaced apart from the center of the second patch antenna 820 by a distance dx in the x-axis direction. The center of the second patch antenna 820 may be spaced apart from the center of the first patch antenna 810 by a distance W1 in the y-axis direction.

To measure an angle in the x-axis direction (e.g., the azimuth angle of AoA), the first patch antenna 810 and the third patch antenna 830 may be arranged in a second direction (the x-axis direction) substantially perpendicular to the first direction (the y-axis direction) not to overlap each other when viewed from the rear side (x-y plane). For example, the third patch antenna 830 may be arranged to be spaced apart from the first patch antenna 810 in a third direction (−x-axis direction) without overlapping the first patch antenna 810.

The third patch antenna 830 may have substantially the same shape and size as the first patch antenna 810. The center of the third patch antenna 830 may be spaced apart from the center of the first patch antenna 810 by a distance dy in the y-axis direction. The center of the third patch antenna 830 may be spaced apart from the center of the first patch antenna 810 by a distance W2 in the x-axis direction.

The distance W1, the distance W2, the distance dx, and/or the distance dy may be determined based on the resonant frequency band of the UWB antenna not to exceed half a wavelength in consideration of the characteristics of AoA.

A plurality of slits may be provided in the patch antennas 810, 820, and 830. The plurality of slits may be designed such that resonance is simultaneously generated in dual frequency bands, and vertical linear polarization in which the polarity direction of an electric field is the y-axis direction and the propagation direction of a RF signal is the −z-axis direction and horizontal linear polarization in which the polarity direction of an electric field is the x-axis direction and the propagation direction of an RF signal is the x-axis direction are transmitted and/or received.

The patch antennas 810, 820, and 830 may have a symmetrical shape when viewed with respect to the x-axis and the y-axis. For example, the patch antennas 810, 820, and 830 may have a rectangular (or square) shape.

The first patch antenna 810 may include a first side (or a left side) 811 extending in the y-axis direction, a second side (or a right side) 812 parallel to the first side 811, a third side (or an upper side) 813 extending in the x-axis direction, and a fourth side (or a lower side) 814 parallel to the third side.

The first slit 811*a* may be provided in the form of a straight line to be perpendicular to the first side 811 from the center of the first side 811 toward the second side 812.

The second slit 812*a* may be provided in the form of a straight line to be perpendicular to the second side 812 from the center of the second side 812 toward the first side 811.

The third slit 813*a* may be provided in the form of a straight line to be perpendicular to the third side 813 from the center of the third side 813 toward the fourth side 814.

The fourth slit 814*a* may be provided in the form of a straight line to be perpendicular to the fourth side 814 from the center of the fourth side 814 toward the third side 813.

Vertical linear polarization of a first frequency band can be transmitted/received due to the lengths of electrical radiation current from the first side 811 and the first slit 811*a* provided at the first side 811 and electrical radiation current from the second side 812 and the second slit 812*a* provided at the second side 812.

Horizontal linear polarization of a second frequency band can be transmitted/received due to the lengths of electrical radiation current from the third side 813 and the third slit 813*a* provided at the third side 813 and electrical radiation current from the fourth side 814 and the fourth slit 814*a* provided at the fourth side 814.

Slits may also be provided in the second patch antenna 820 and the third patch antenna 830 to have substantially the same shapes as those in the first patch antenna 810. For example, slits may also be provided in the second patch antenna 820 and the third patch antenna 830 at substantially the same locations as those in the first patch antenna 810.

The feeding point of each of the patch antennas 810, 820, and 830 connected to the transmission lines may be located at a corner (or a vertex) of each patch antenna. In all of the patch antennas 810, 820, and 830, the feeding points may be substantially the same as the upper left corners, or a feeding point may be positioned at a corner that causes the shortest signal path to be provided between the connector 850 and the patch antenna among the four corners of each patch antenna.

An electronic device according to an embodiment may include a circuit board, an electronic component arranged in a first direction (the −z direction) from the circuit board, a metal member arranged in the first direction (the −z direction) from the electronic component to overlap and cover the electronic component, and an FPCB arranged in the first direction (−z direction) from the metal member 614 and including an antenna, wherein the FPCB includes a first portion in which the antenna is provided in the form of a patch antenna to overlap the metal member, a second portion coupled to a connector of the circuit board, and a third portion arranged between the first portion and the second portion. A layered structure of the FPCB may include a first conductive layer in which the patch antenna is provided, a second conductive layer forming a ground layer, and an intermediate layer arranged between the first conductive layer and the second conductive layer and having a thickness that is reduced in the third portion. The intermediate layer may include a dielectric material, which is at least partially removed in the third portion to provide a groove.

The intermediate layer may include a first intermediate layer including the dielectric material arranged in the first direction (the −z direction) from the second conductive layer, wherein the dielectric material is at least partially removed in the third portion, a second intermediate layer arranged in the first direction (the −z direction) from the first intermediate layer, wherein the second intermediate layer includes a pressure-sensitive adhesive arranged to correspond to the first portion and an intermediate conductive layer arranged to correspond to the second portion and the third portion 530, and a third intermediate layer including the dielectric material arranged in the first direction (the −z direction) from the second intermediate layer, wherein the dielectric material is arranged to correspond to each of the first portion, the second portion, and the third portion.

The metal member has a hole through which the third portion of the FPCB passes, and the second portion of the FPCB may extend from one end of the third portion 530, which passes through the hole in the metal member, to be coupled to the connector of the circuit board.

The thickness of the third portion of the FPCB may be smaller than each of the thickness of the first portion and the thickness of the second portion.

The electronic component may include one or more of a memory, a CPU, an AP, a graphics processor, an ISP, a sensor hub processor, or a CP.

The metal member may include SUS.

The first conductive layer may include a first patch antenna, a second patch antenna arranged in the x direction from the first patch antenna, and a third patch antenna arranged in the y direction perpendicular to the x direction from the first patch antenna.

Each of the second patch antenna and the third patch antenna may have the same structure as the first patch antenna.

The first conductive layer may further include a first transmission line connecting the connector and the first patch antenna to each other, a second transmission line connecting the connector and the second patch antenna to each other, and a third transmission line connecting the connector and the third patch antenna to each other.

An electronic device according to an embodiment may include a circuit board, an electronic component arranged in a first direction (the −z direction) from the circuit board, a metal member arranged in the first direction (the −z direction) from the electronic component to overlap and cover the electronic component, and an FPCB arranged in the first direction (the −z direction) from the metal member and including an antenna, wherein the FPCB may include a first portion in which the antenna is provided in the form of a patch antenna to overlap the metal member, a second coupled to a connector of the circuit board, and a third portion arranged between the first portion and the second portion. A layered structure of the FPCB may include dielectric materials having a first thickness in the first portion overlapping the metal member and a second thickness that is smaller than the first thickness in the second portion and the third portion, a first conductive layer provided in the first direction (the −z direction) from the dielectric materials, and an intermediate conductive layer provided in a second direction (the z direction), which is opposite to the first direction (the −z direction), from the dielectric materials. The intermediate conductive layer may be provided only in the second portion and the third portion and may not be provided in the first portion so that a portion of the dielectric materials and may be arranged to face the metal member.

The conductive layer of the FPCB may not be provided between the dielectric materials arranged to correspond to the first portion of the FPCB and the metal member.

The dielectric materials may include a first dielectric material arranged to correspond to the first portion and having the first thickness, and a second dielectric material arranged to corresponding to the second portion and the third portion and having the second thickness.

The intermediate conductive layer may be arranged in the second direction (the z direction) from the second dielectric material.

The thickness of the first dielectric material may be greater than a sum of the thickness of the second dielectric material and the thickness of the intermediate conductive layer.

The metal member may have a hole through which the third portion of the FPCB passes, and the second portion of the FPCB may extend from one end of the third portion, which passes through the hole in the metal member, to be coupled to the connector of the circuit board.

The third portion of the FPCB may be thinner than each of the first portion and the second portion.

The electronic component may include one or more of, a memory, a CPU, an AP, a graphics processor, an ISP, a sensor hub processor, or a CP.

The metal member may include SUS.

The antenna may include a first patch antenna, a second patch antenna arranged in the y direction from the first patch antenna, and a third patch antenna arranged in the x direction perpendicular to the y direction, from the first patch antenna.

Each of the second patch antenna and the third patch antenna may have the same structure as the first patch antenna.

Figure 9A:
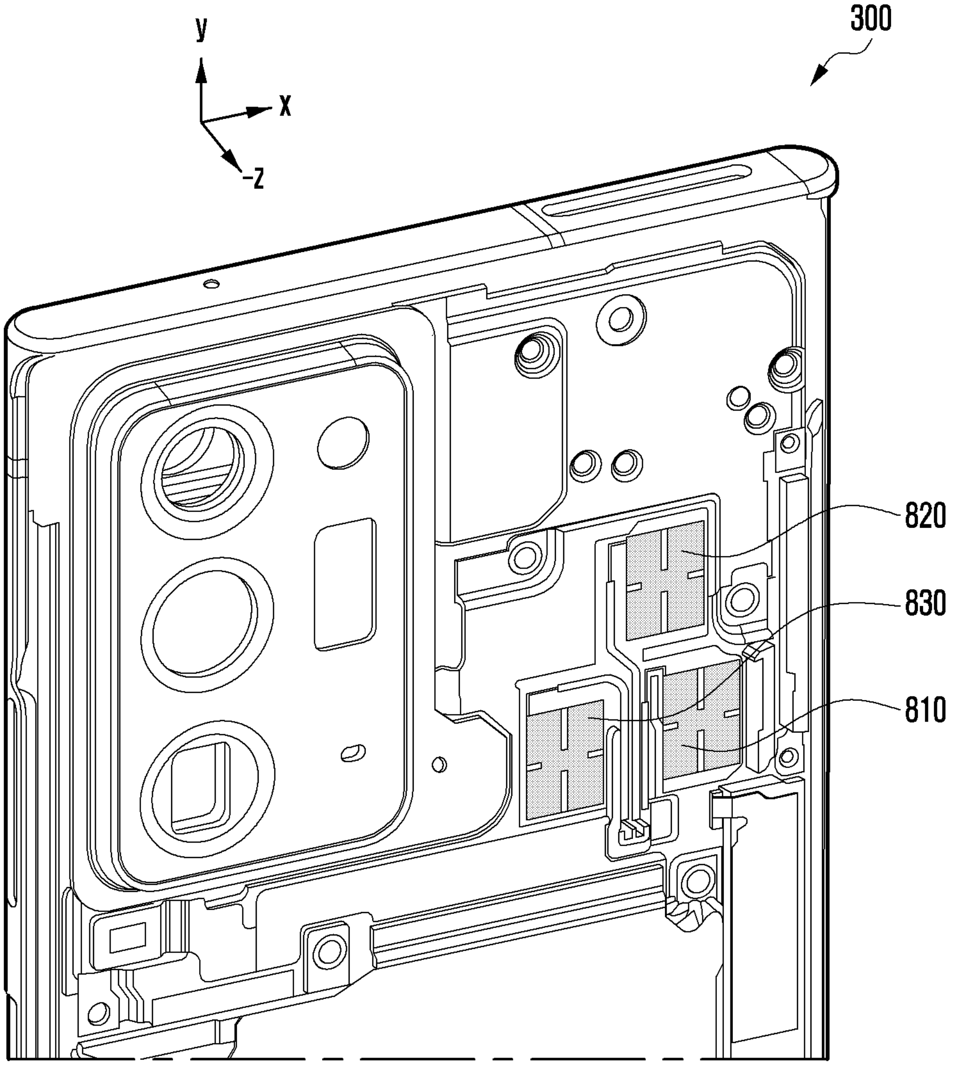
FIG. 9A illustrates a radiation pattern when an electronic device is oriented in a vertical mode, according to an embodiment.

FIG. 9A illustrates a radiation pattern when an electronic device is oriented in a vertical mode according to an embodiment.

Referring to FIG. 9A, when the electronic device 300 is oriented in the vertical mode (or a portrait mode), the first patch antenna 810 and the third patch antenna 830 may receive UWB signals. The electronic device 300 may calculate and/or post-process a signal incidence angle on the −z-x plane illustrated in FIG. 9A, based on a phase difference between UWB signals received by each of the first patch antenna 810 and the third patch antenna 830.

Figure 9B:
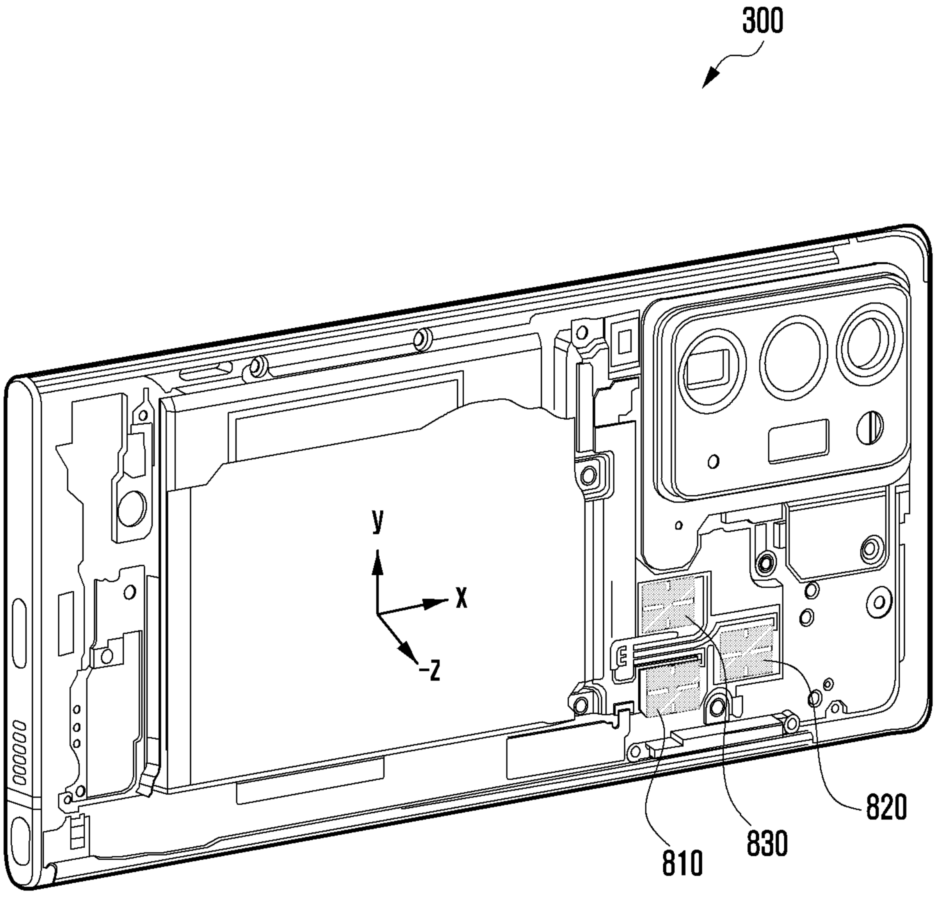
FIG. 9B illustrates a radiation pattern when an electronic device is oriented in a horizontal mode, according to an embodiment.

FIG. 9B illustrates a radiation pattern when an electronic device is oriented in a horizontal mode according to an embodiment.

Referring to FIG. 9B, when the electronic device 300 is oriented in the horizontal mode (or landscape mode), the first patch antenna 810 and the second patch antenna 820 may receive UWB signals. The electronic device 300 may calculate and/or post-process a signal incidence angle on the −z-x plane illustrated in FIG. 9B based on a phase difference between UWB signals received by each of the first patch antenna 810 and the second patch antenna 820.

The first patch antenna 810, the second patch antenna 820, and the third patch antenna 830 may operate simultaneously, and may be implemented to calculate angles of incident waves on the z-x plane and y-z plane.

In an electronic device according to an embodiment, it is possible to provide an FPCB structure that includes a high-frequency (e.g., UWB) antenna and easily disposed and assembled in an internal space of a housing. The electronic device may measure the location of another electronic device by performing a positioning operation using a high-frequency (e.g., UWB) antenna structure according to various embodiments.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:

a circuit board;

an electronic component arranged in a first direction from the circuit board;

a metal member arranged in the first direction from the electronic component and disposed to overlap the electronic component; and a flexible printed circuit board (FPCB) arranged in the first direction from the metal member, wherein the FPCB includes:

an antenna, a first portion in which the antenna is provided in a form of a patch antenna that overlaps the metal member, a second portion coupled to a connector of the circuit board; and a third portion arranged between the first portion and the second portion, wherein a layered structure of the FPCB includes:

a dielectric material having a first thickness in the first portion and having a second thickness, which is smaller than the first thickness, in the second portion and the third portion, a first conductive layer provided in the first direction from the dielectric material, and an intermediate conductive layer provided in a second direction opposite to the first direction, from the dielectric material, wherein the intermediate conductive layer is provided only in the second portion and the third portion, and is not provided in the first portion, and wherein a portion of the dielectric material in the first portion is disposed to face the metal member.

2. The electronic device of claim 1, wherein the intermediate conductive layer of the FPCB is not provided between the metal member and the dielectric material in the first portion of the FPCB.

3. The electronic device of claim 1, wherein the dielectric material includes:

a first dielectric material arranged in the first portion and having the first thickness; and a second dielectric material arranged in the second portion and the third portion and having the second thickness.

4. The electronic device of claim 3, wherein the intermediate conductive layer is arranged in the second direction from the second dielectric material.

5. The electronic device of claim 4, wherein the first dielectric material has a thickness greater than a sum of a thickness of the second dielectric material and a thickness of the intermediate conductive layer.

6. The electronic device of claim 1, wherein the metal member includes a hole through which the third portion of the FPCB passes, and wherein the second portion of the FPCB extends from a first end of the third portion, which passes through the hole in the metal member, and is coupled to the connector of the circuit board.

7. The electronic device of claim 1, wherein the third portion of the FPCB is thinner than each of the first portion and the second portion.

8. The electronic device of claim 1, wherein the electronic component includes one or more of:

a memory;

a central processing unit (CPU);

an application processor (AP);

a graphics processor;

an image signal processor (ISP);

a sensor hub processor; or a communication processor (CP).

9. The electronic device of claim 1, wherein the metal member includes stainless steel (SUS).

10. The electronic device of claim 1, wherein the antenna includes:

a first patch antenna;

a second patch antenna arranged in a y-direction from the first patch antenna; and a third patch antenna arranged in a x direction perpendicular to the y direction, from the first patch antenna.

11. The electronic device of claim 10, wherein each of the second patch antenna and the third patch antenna has a same structure as the first patch antenna.

12. An electronic device, comprising:

a circuit board;

an electronic component arranged in a first direction from the circuit board;

a metal member arranged in the first direction from the electronic component and disposed to overlap the electronic component; and a flexible printed circuit board (FPCB) arranged in the first direction from the metal member, wherein the FPCB includes:

an antenna, a first portion in which the antenna is provided in a form of a patch antenna that overlaps the metal member, a second portion coupled to a connector of the circuit board, and a third portion arranged between the first portion and the second portion, wherein a layered structure of the FPCB includes:

a first conductive layer in which the patch antenna is provided, a second conductive layer providing a ground layer, and an intermediate layer arranged between the first conductive layer and the second conductive layer, wherein a thickness of the intermediate layer is reduced in the third portion, and wherein the intermediate layer includes a dielectric material that is at least partially removed in the third portion to provide a groove.

13. The electronic device of claim 12, wherein the intermediate layer includes:

a first intermediate layer including the dielectric material arranged in the first direction from the second conductive layer, wherein the dielectric material is at least partially removed in the third portion;

a second intermediate layer arranged in the first direction from the first intermediate layer, wherein the second intermediate layer includes a pressure-sensitive adhesive arranged to correspond to the first portion and an intermediate conductive layer arranged to correspond to the second portion and the third portion; and a third intermediate layer including the dielectric material arranged in the first direction from the second intermediate layer, wherein the dielectric material is arranged to correspond to each of the first portion, the second portion, and the third portion.

14. The electronic device of claim 12, wherein the metal member includes a hole through which the third portion of the FPCB passes, and wherein the second portion of the FPCB extends from a first end of the third portion, which passes through the hole in the metal member, and is coupled to the connector of the circuit board.

15. The electronic device of claim 12, wherein the third portion of the FPCB is thinner than each of the first portion and the second portion.

16. The electronic device of claim 12, wherein the electronic component includes one or more of:

a memory;

a central processing unit (CPU);

an application processor (AP);

a graphics processor;

an image signal processor (TSP);

a sensor hub processor; or a communication processor (CP).

17. The electronic device of claim 12, wherein the metal member includes stainless steel (SUS).

18. The electronic device of claim 12, wherein the first conductive layer includes:

a first patch antenna;

a second patch antenna arranged in a y-direction from the first patch antenna; and a third patch antenna arranged in a x direction perpendicular to the y direction, from the first patch antenna.

19. The electronic device of claim 18, wherein each of the second patch antenna and the third patch antenna has a same structure as the first patch antenna.

20. The electronic device of claim 18, wherein the first conductive layer further includes:

a first transmission line connecting the connector and the first patch antenna to each other;

a second transmission line connecting the connector and the second patch antenna to each other; and a third transmission line connecting the connector and the third patch antenna to each other.

* * * * *